United States Patent [19]

Hanada et al.

[11] Patent Number: 5,321,083
[45] Date of Patent: Jun. 14, 1994

[54] COATING COMPOSITIONS

[75] Inventors: Kazuyuki Hanada, Washinomiya; Iwao Misaizu, Urawa; Katsumi Kuriyama, Koshigaya, all of Japan

[73] Assignees: Dainichiseika Color & Chemicals Mfg. Co., Ltd.; Ukima Colour & Chemicals Mfg. Co., Ltd., both of Tokyo, Japan

[21] Appl. No.: 883,900

[22] Filed: May 12, 1992

Related U.S. Application Data

[63] Continuation of Ser. No. 595,599, Oct. 10, 1990, abandoned.

[51] Int. Cl.⁵ .............................................. C08G 18/62
[52] U.S. Cl. .................................. 525/102; 525/104; 524/506; 524/507
[58] Field of Search ................ 525/104, 102; 524/506, 524/507

[56] References Cited

U.S. PATENT DOCUMENTS

| 4,468,492 | 8/1984 | Piccirilli et al. | 525/102 |
| 4,491,650 | 1/1985 | Rizk et al. | 525/102 |
| 4,804,709 | 2/1989 | Takago et al. | 525/102 |
| 4,837,274 | 6/1989 | Kawakubu | 525/100 |
| 4,851,475 | 7/1989 | Federici et al. | 525/104 |
| 5,045,599 | 9/1991 | Murase | 525/102 |

*Primary Examiner*—Ralph H. Dean
*Attorney, Agent, or Firm*—Oblon, Spivak, McClelland, Maier & Neustadt

[57] ABSTRACT

Disclosed herein are coating compositions comprising a fluoropolymer modified with a modifier. The modifier is a reaction product of at least one compound selected from polysiloxane compounds, fluorine-containing compounds and silane coupling agents, each containing at least one reactive organic functional group, with an organic polyisocyanate; and contains at least one free isocyanate group.

7 Claims, No Drawings

COATING COMPOSITIONS

This application is a continuation of application Ser. No. 07/595,599, filed on Oct. 10, 1990, now abandoned.

BACKGROUND OF THE INVENTION

1) Field of the Invention:

The present invention relates to coating compositions, and more specifically to cold-setting coating compositions capable of forming films excellent in surface properties. Particularly, this invention relates to fluoropolymer-base coating compositions.

2) Description of the Related Art:

Coating compositions have conventionally been used widely to form a film on the surfaces of various structures, buildings, articles and the like so as to prevent corrosion and deterioration of such coated items and in addition, to provide them with an excellent external appearance.

Various coating compositions have been known as such protective and decorative ones. In recent years, fluoropolymer-base coating compositions have been increasingly finding wide-spread utility as coating compositions excellent in various durabilities such as weather resistance and antifouling property.

Fluoropolymers inherently have excellent weather resistance, heat resistance, water repellency, chemical resistance, electrical properties, etc. They, however, are not soluble in general paint solvents. Accordingly, they have been used exclusively for extremely special applications.

In order to overcome these drawbacks, fluoropolymers soluble in general paint solvents have been developed each by copolymerizing a fluorine-containing monomer with a general monomer, and some of them are used in coating compositions. Such resins, however, contain general fluorine-free monomer moieties, thereby unavoidably reducing inherent excellent essential properties of fluoropolymers such as superb antifouling property, abrasion resistance, non-tacky property and lubricating property.

SUMMARY OF THE INVENTION

An object of the present invention is therefore to provide a coating composition comprising a copolymer of a fluorine-containing monomer and a fluorine-free monomer, which copolymer is capable of forming films having the various inherent excellent properties of fluoropolymers in spite of the fact that it has good solubility in general paint solvents.

In one aspect of the present invention, there is thus provided a coating composition comprising as a film-forming component a fluoropolymer modified with a modifier, said modifier being a reaction product of at least one compound selected from polysiloxane compounds, fluorine-containing compounds and silane coupling agents, each containing at least one reactive organic functional group, with an organic polyisocyanate and containing at least one free isocyanate group.

The coating compositions of the present invention are useful for the protective and decorative coating of metallic structural materials such as steel plates, aluminium plates and aluminium sashes; inorganic structural materials such as glass, cement and concrete; lumbers; and plastic structural materials such as FRP, polyethylene, polypropylene, nylon, polyesters, polyvinyl chloride resins, ethylene-vinyl acetate resins and acrylic resins.

They can form films having excellent surface hardness, gloss, solvent resistance, antifouling property, light resistance and non-tacky property and the like.

Such advantageous effects have been derived from the compensation of reductions of various properties of the fluoropolymer, said reductions being attributed to the copolymerization of another monomer, by the modification with the polysiloxane-containing modifier.

DETAILED DESCRIPTION OF THE INVENTION AND PREFERRED EMBODIMENTS

In invention will hereinafter be described in further detail.

Preferred examples of the siloxane compounds containing one or more reactive organic functional groups and usable in the invention may include:

(1) Amino-modified siloxane oils:

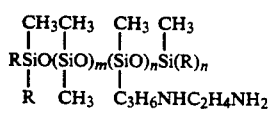

wherein m = 1-10, n = 2-10, and R = $CH_3$ or $OCH_3$.

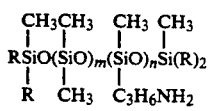

wherein m = 1-10, n = 2-10, and R = $CH_3$ or $OCH_3$.

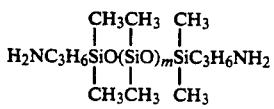

wherein m = 0-200.

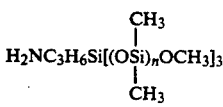

wherein n = 2-10.

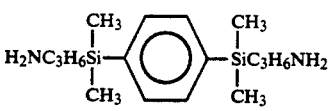

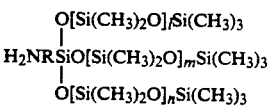

wherein branched sites =2-3, R = lower alkyl, l = 2-200, m = 2-200, and n = 2-200.

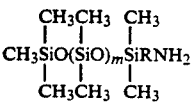

wherein n = 1-200, and R = lower alkyl.

(2) Epoxy-modified siloxane oils:

-continued

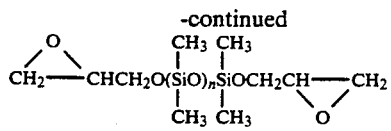

wherein n = 1-200.

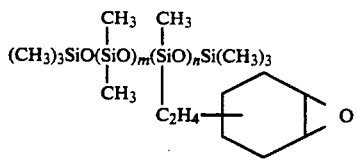

wherein m = 1-10, and n = 2-10.

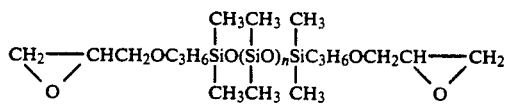

wherein n = 1-200.

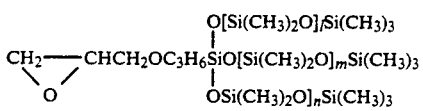

wherein branched sites = 2-3, R = lower alkyl, l = 2-200, m = 2-200, and n = 2-200.

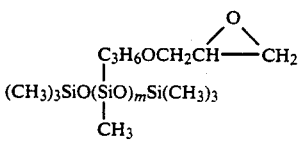

wherein n = 1-10.

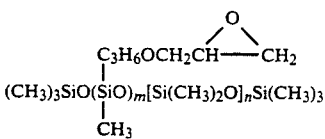

wherein m = 1-10, and n = 2-10.

The above epoxy compounds can be used after introducing an active hydrogen atom in at lest one end thereof by reacting them with a polyol, polyamine, polycarboxylic acid or the like.

(3) Alcohol-modified siloxane oils:

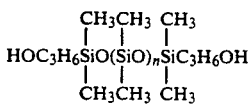

wherein n = 1-200.

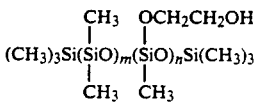

wherein m = 1-10 and n = 2-10.

-continued

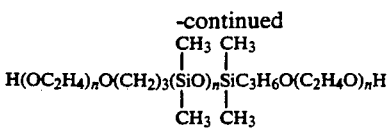

wherein n = 0-200.

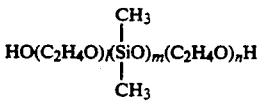

wherein l = 1-10, m = 10-200, and n = 1-5.

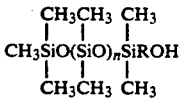

wherein n = 1-200, and R = lower alkyl.

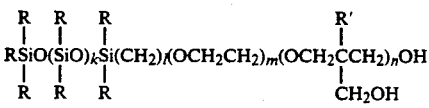

wherein R = lower alkyl, R' = hydrogen atom or alkyl group, k = 1-250, l = 0-5, m = 0-50, and n = 1-3.

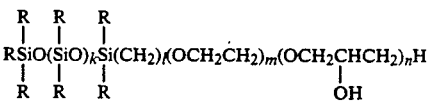

wherein R = lower alkyl, R' = hydrogen atom or alkyl group, k = 1-250, l = 0-5, m = 0-50, and n = 2-3.

(4) Mercapto-modified siloxane oils:

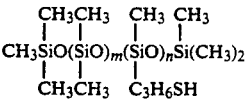

wherein m = 1-10, and n = 2-10.

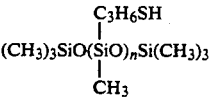

wherein n = 2-10.

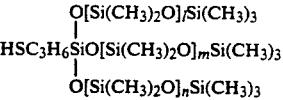

wherein branched sites: 2 or 3, R = lower alkyl, l = 2-200, m = 2-200, and n = 2-200.

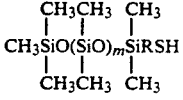

wherein n = 1-200, and R = lower alkyl.

(5) Carboxyl-modified siloxane oils:

-continued

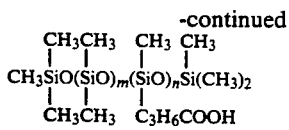

wherein m = 1–10, and n = 2–10.

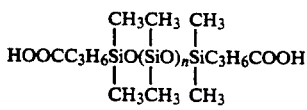

wherein n = 1–200.

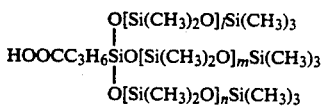

wherein branched sites: 2 or 3, R = lower alkyl, l = 2–200, m = 2–200, and n = 2–200.

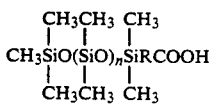

wherein n = 1–200, and R = lower alkyl.

Preferred examples of the fluorine compounds containing one or more reactive organic functional groups as described above may include:

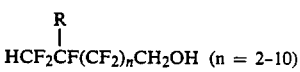 (1)

 (2)

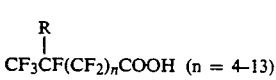 (3)

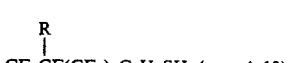 (4)

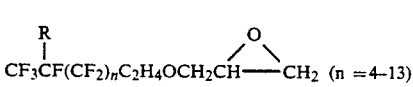 (5)

 (6)

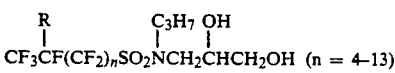 (7)

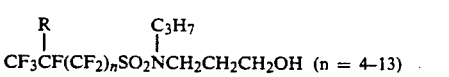 (8)

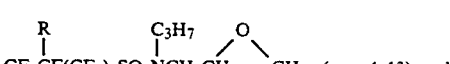 (9)

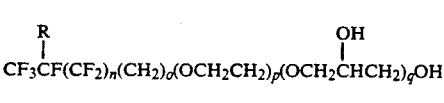 (10)

(n = 4–13, o = 0–6, p = 0–3 and q = 1–3).

In the above formulas, R represents F or $CF_3$.

Silane coupling agents containing one or more reactive organic functional groups and useful in the present invention are compounds which contain at least one of various reactive groups along with one or more alkoxysilyl groups. Examples of the reactive groups include amino, epoxy, hydroxyl, thioalcohol, carboxyl, vinyl groups and so on. Among them, particularly preferred reactive groups are amino, hydroxyl and thioalcohol groups.

The above coupling agents can be represented, for example, by the following formula (I) or (II).

 (I)

 (II)

In the above formulas, X represents such a reactive group as described above or an alkyl group having such a reactive group; R a hydrogen atom, a lower alkyl group or a lower alkoxyl group; R' a lower alkyl group; A a hydrogen atom or an aminoethyl, glycidyl or (meth)acryloyl group; B an aryl, trialkoxysilylpropyl, dialkoxyalkylsilylpropyl or glycidyl group; m plus n is 3; and n stands for 2 or 3.

The following are some preferred specific examples of these coupling agents:

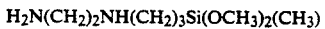

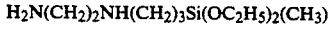

$H_2N(CH_2)_2NH(CH_2)_3Si(OCH_3)_3$ $H_2N(CH_2)_2NH(CH_2)_3Si(OC_2H_5)_3$ $H_2N(CH_2)_3Si(OCH_3)_3$ $H_2N(CH_2)_3Si(OC_2H_5)_3$

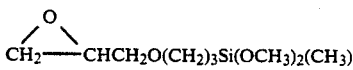

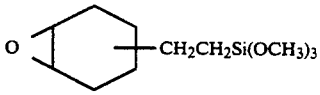

$HS(CH_2)_3Si(OCH_3)_3$ $HS(CH_2)_3Si(OC_2H_5)_3$

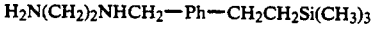

It is to be noted that the above polysiloxane compounds, fluorine compounds and silane coupling agents are merely illustrative of the compounds preferred in the invention and the invention is not necessarily limited to such exemplified compounds. The above-exemplified compounds and other compounds are commercially sold these days and are hence readily available on the market. They are all usable in the invention.

As the organic polyisocyanate to be reacted with at least one compound selected from such polysiloxane compounds, fluorine compounds and silane coupling agents, conventionally-known organic polyisocyanates are all usable. Preferred examples of polyisocyanates include:

Toluene-2,4-diisocyanate,
4-Methoxy-1,3-phenylene diisocyante,
4-Isopropyl-1,3-phenylene diisocyanate,
Chloro-1,3-phenylene diisocyanate,
4-Buthoxy-1,3-phenylene diisocyanate,
2,4-Diisocyanate-diphenylether,
Methylene diisocyanate,
4,4-Methylenebis(phenyl isocyanate),
Durylene diisocyanate,
1,5-Naphthalene diisocyanate,
Benzidine diisocyanate,
o-Nitrobenzidine diisocyanate,
4,4-Diisocyanate dibenzidyl,
1,4-Tetramethylene diisocyanate,
1,6-Tetramethylene diisocyanate,
1,10-Deoamethylene diisocyanate,
1,4-Cyclohexylene diisocyanate,
Xylylene diisocyanate,
4,4-Methylenebis(cyclohexyl isocyanate), and
1,5-Tetrahydronaphthalene diisocyanate.

Adducts of the above-described organic polyisocyanates with other compounds, for example, those represented by the following formulas can also be mentioned, although the invention is not limited to the use of these examples.

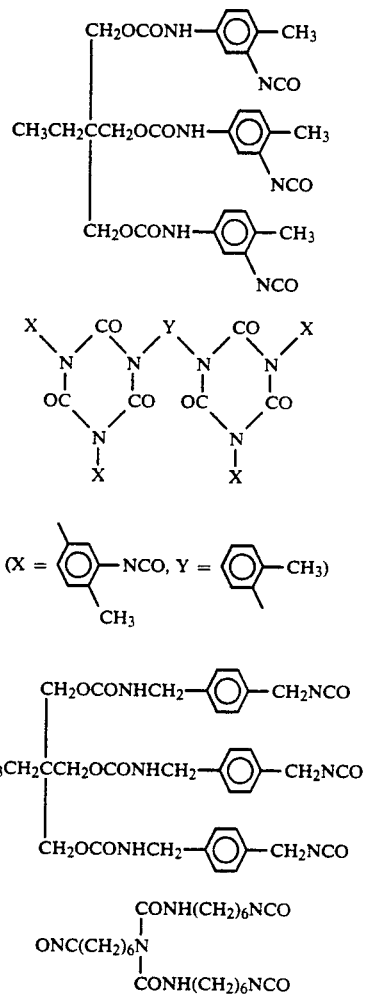

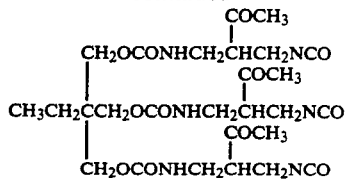

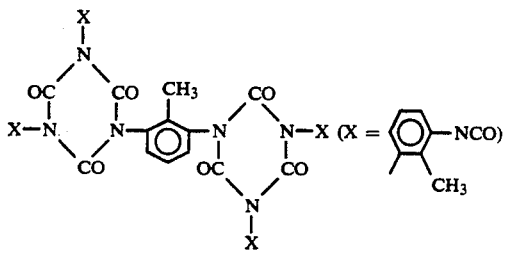

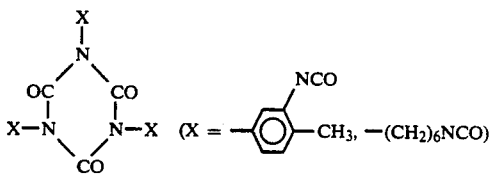

Urethane polymers obtained by reacting these organic polyisocyanates with low-molecular-weight polyols or polyamines to form terminated isocyanates can of course be used.

Modifiers useful in the present invention can each be obtained easily by reacting, in the presence or absence of an organic solvent and a catalyst about 0°–150° C., preferably 20°–80° C. for about 10 minutes to 3 hours, at least one compound selected from polysiloxane compounds, fluorine compounds and silane coupling agents, each containing reactive one or more organic groups, with such an organic polyisocyanate as described above at such a functional group ratio that the number of the isocyanate groups is larger by one or more, preferably one or two, compared with that of the organic functional group or groups per molecule.

These modifiers can be prepared in a solvent or without any solvent. From the process standpoint, it is advantageous to prepare them in an organic solvent because the resulting solutions can be used as they are for the modification of a fluoropolymer.

Any organic solvents can be used in the preparation of such modifiers as long as they are inert to the respective reactants and reaction product.

Preferred examples of such an organic solvent include methyl ethyl ketone, methyl-n-propyl ketone, methyl isobutyl ketone, diethyl ketone, methyl formate, ethyl formate, propyl formate, methyl acetate, ethyl acetate, butyl acetate and the like. It is also feasible to use acetone, cyclohexane, tetrahydrofuran, dioxane, methanol, ethanol, isopropyl alcohol, butanol, toluene, xylene, dimethylformamide, dimethylsulfoxide, perchloroethylene, trichloroethylene, methylcellosolve, butylcellosolve, cellosolve acetate and the like.

The fluoropolymer modified with the above modifier and used as a film-forming resin in the present invention contains groups reactive with isocyanate groups and is soluble in a solvent. Various fluoropolymers have been put on the market as such fluoropolymers. They are all usable in the present invention.

Examples of suitable fluoropolymers include copolymers of fluorine-containing olefin monomers such as tetrafluoroethylene and trifluorochloroethylene and monomers containing one or more functional groups reactive with an isocyanate group, such as hydroxyl, carboxyl, amino, acid anhydride, epoxy and thioalcohol groups; or copolymers with those reactive groups incorporated after copolymerization. Typical examples of these copolymerizable monomers include vinyl acetate, vinyl esters, and (meth)acrylic acid and various esters thereof. Upon copolymerization, a third monomer not containing such reactive groups can also be copolymerized. The fluorine-containing monomer and the other monomer are copolymerized at a ratio such that the resulting copolymer is soluble in general paint solvents. For example, the molar ratio of the fluorine-containing monomer in the copolymer may preferably range from 30% to 90%.

Solvents used in general coating compositions can also be used in the present invention. Solvents exemplified above can be mentioned, for example.

The coating composition of the present invention contains the above-described components as essential components. They are mixed at a ratio such that the solvent is contained to give a total solid content in a range of from 5 to 50 wt. %. It is preferable to mix the film-forming fluoropolymer in a proportion of about 5-30 wt. % per 100 parts by weight of the coating composition and also to mix the modifier in a proportion of 1-100 parts by weight per 100 parts by weight of the fluoropolymer. The reaction of the modifier with the fluoropolymer can be conducted either before or after the preparation of the coating composition. No particular limitation is imposed in this respect.

Like other general coating compositions, the coating composition of the present invention can contain one or more of extender pigments, organic pigments, inorganic pigments, other film-forming resins, plasticizers, ultraviolet absorbers, antistatic agents, leveling agents, curing agents and catalysts and the like, as needed.

As other general film-forming resins which can be used in combination, conventionally-known various film-forming resins can be mentioned. They are all usable. Examples of them include vinyl chloride resins, vinylidene chloride resins, vinyl chloride/vinyl acetate/vinyl alcohol copolymer resins, alkyd resins, epoxy resins, acrylonitrile-butadiene resins, polyurethane resins, polyurea resins, nitrocellulose resins, polybutyral resins, polyester resins, melamine resins, urea resins, acrylic resins, polyamide resins and so on. Particularly preferred are resins which have groups reactive with an isocyanate group. These resins can be used either singly or in combination and also as solutions or dispersions in an organic solvent.

Various compounds can be used as crosslinking or curing agents. Preferred are such polyisocyanate compounds as described above. Particularly useful ones lo are yellowing-free diisocyanates such as hexamethylene diisocyanate and isophorone diisocyanate and adducts thereof.

When the coating composition of the present invention is prepared as a cold-setting type by adding such a polyisocyanate as a curing agent, it is preferable to add and mix, for example, an amine-type or organic-metal type catalyst in a proportion of about 0.0001-1 part by weight per 100 parts by weight of the coating composition.

The preparation process for the coating compositions of the present invention itself can be exactly the same as the conventional preparation procedure, and no particular limitation is imposed on it.

The present invention will hereinafter be described more specifically by the following examples and comparative examples, in which all designations of "part or parts" and "%" are on a weight basis unless otherwise specifically indicated. [Group I: Examples of single use of polysiloxane compounds]

Referential Example 1 (Preparation of modifier)

Hexamethylene diisocyanate (32.3 parts) and 0.01 part of dibutyltin dilaurate were added to 155 parts of ethyl acetate. While the mixture thus obtained was stirred thoroughly at 80° C., gradually added dropwise and reacted were 300 parts of an aminopropyl-terminated polydimethylsiloxane (molecular weight:1,560) having the following structure:

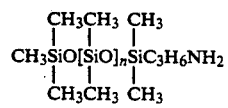

wherein n is a value to give a molecular weight of 1,560.

After the reaction was completed, ethyl acetate was removed by evaporation, whereby 328 parts of a clear liquid modifier (I-1) were obtained.

From an infrared absorption spectrum of the modifier, an absorption by free isocyanate groups was observed at 2,270 cm$^{-1}$ and an absorption band based on —Si—O— groups was observed at 1,090 cm$^{-1}$. As a result of a quantitative analysis of free isocyanate groups in the modifier, their content was found to be 2.30% while the theoretical value is 2.43%.

Accordingly, the principal structure of the above modifier is presumed to have the following formula:

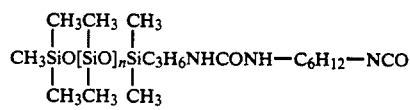

Referential Example 2 (Preparation of modifier)

Isophorone diisocyanate (15.1 parts) and 0.005 part of dibutyltin dilaurate were added to 70 parts of ethyl acetate. While the mixture thus obtained was stirred thoroughly at 80° C., gradually added dropwise and reacted were 150 parts of a hydroxyl-terminated polydimethylsiloxane (molecular weight: 2,200) having the following structure:

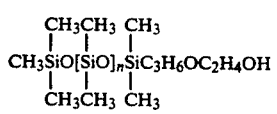

wherein n is a value to give a molecular weight of 2,200.

After the reaction was completed, ethyl acetate was removed by evaporation, whereby 162 parts of a clear liquid modifier (I-2) were obtained.

From an infrared absorption spectrum of the modifier, an absorption by free isocyanate groups was observed at 2,270 cm$^{-1}$ and an absorption band based on —Si—O— groups was observed at 1,090 cm$^{-1}$. As a result of a quantitative analysis of free isocyanate groups in the modifier, their content was found to be 1.61% while the theoretical value is 1.73%.

Accordingly, the principal structure of the above modifier is presumed to have the following formula:

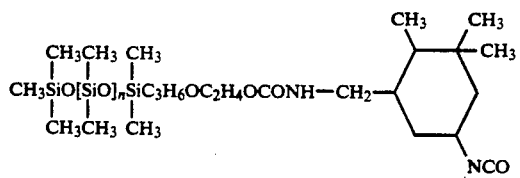

Referential Example 3 (Preparation of modifier)

Hydrogenated MDI (21.4 parts) and 0.006 part of dibutyltin dilaurate were added to 86 parts of ethyl acetate. While the mixture thus obtained was stirred thoroughly at 80° C., 180 parts of the same hydroxyl-terminated polydimethylsiloxane (molecular weight: 2,200) as that used in Example 2 were gradually added dropwise and reacted.

After the reaction was completed, ethyl acetate was removed by evaporation, whereby 194 parts of a clear liquid modifier (I-3) were obtained.

From an infrared absorption spectrum of the modifier, an absorption by free isocyanate groups was observed at 2,270 cm$^{-1}$ and an absorption band based on —Si—O— groups was observed at 1,090 cm$^{-1}$. As a result of a quantitative analysis of free isocyanate groups in the modifier, their content was found to be 1.58% while the theoretical value is 1.70%.

Accordingly, the principal structure of the above modifier is presumed to have the following formula:

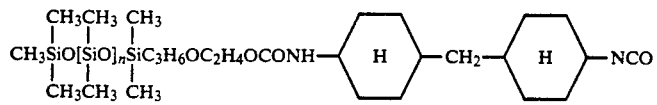

Referential Example 4 (Modification of resin)

To 300 parts of a fluoroolefin-vinyl ether copolymer resin solution (product of Asahi Glass Co., Ltd.; solid content: 50%; hydroxyl number: 24 mg-KOH/g), 7 parts of the modifier (I-1) were added and reacted at 80° C. for 6 hours, whereby a solution of a fluoropolymer modified with the above modifier was obtained. From an infrared absorption spectrum of the resultant modified resin, no isocyanate groups were recognized. This appears to indicate that the modifier was grafted on the resin.

Referential Example 5 (Modification of resin)

To 300 parts of a fluoroolefin-vinyl ether copolymer resin solution (product of Asahi Glass Co., Ltd.; solid content: 60%; hydroxyl number: 32 mg-KOH/g), 9 parts of the modifier (I-2) were added and reacted at 80° C. for 5 hours, whereby a solution of a fluoropolymer modified with the above modifier was obtained. From an infrared absorption spectrum of the resultant modified resin, no isocyanate groups were recognized. This appears to indicate that the modifier was grafted on the resin.

Referential Example 6 (Modification of resin)

To 300 parts of a fluoroolefin-vinyl ether copolymer resin solution (product of Asahi Glass Co., Ltd.; solid content: 50%; hydroxyl number: 24 mg-KOH/g), 11 parts of the modifier (I-3) were added and reacted at 80° C. for 4 hours, whereby a solution of a fluoropolymer modified with the above modifier was obtained. From an infrared absorption spectrum of the resultant modified resin, no isocyanate groups were recognized. This appears to indicate that the modifier was grafted on the resin.

Examples 1–3 and Comparative Examples 1–3

Based on a conventional method for the preparation of coating formulations, the modified resin solutions obtained in Referential Examples 4–6 were separately formed into coating formulations in accordance with their corresponding compositions shown in Table 1. Each of the coating formulations thus obtained was coated on a zinc-coated steel plate (phosphated) to give a dry coat thickness of 25 μm, followed by drying at 130° C. for 1 minute and at 25° C. for 1 day to form a film. Various properties of each film were measured. The results are shown in Table 2.

In Comparative Examples 1–3, coating formulations were prepared from the unmodified fluoropolymer solutions used in Referential Examples 4–6, respectively.

TABLE 1
(Compositions of Coating Formulations)

| Component | Example 1 | Example 2 | Example 3 |
|---|---|---|---|
| Resin[1] | 100 | 100 | 100 |
| MEK | 75 | 75 | 75 |
| Xylene | 25 | 25 | 25 |
| Titanium oxide | 20 | 20 | 20 |
| Curing agent | 9.3 | 9.3 | 9.3 |
| Catalyst | 0.0004 | 0.0004 | 0.0004 |

| Component | Comp. Ex. 1 | Comp. Ex. 2 | Comp. Ex. 3 |
|---|---|---|---|
| Resin[2] | 100 | 100 | 100 |
| MEK | 75 | 75 | 75 |
| Xylene | 25 | 25 | 25 |
| Titanium oxide | 20 | 20 | 20 |
| Curing agent | 9.3 | 9.3 | 9.3 |
| Catalyst | 0.0004 | 0.0004 | 0.0004 |

TABLE 2
(Physical Properties of Films)

| Physical property of film | Example 1 | Example 2 | Example 3 | Comp. Ex. 1 | Comp. Ex. 2 | Comp. Ex. 3 |
|---|---|---|---|---|---|---|
| Gloss | 78 | 80 | 79 | 80 | 82 | 81 |
| Adhesion | 100/100 | 100/100 | 100/100 | 100/100 | 100/100 | 100/100 |
| Antifouling property | | | | | | |
| Lip stick | A | A | A | A | A | A |
| Crayon | A | A | A | A | A | A |

TABLE 2-continued
(Physical Properties of Films)

| Physical property of film | Example 1 | Example 2 | Example 3 | Comp. Ex. 1 | Comp. Ex. 2 | Comp. Ex. 3 |
|---|---|---|---|---|---|---|
| Quick-drying felt pen[1] | A | A | A | C | C | C |
| Quick-drying felt pen[2] | A | A | A | A | A | A |
| Surface property | | | | | | |
| Water repellency | A | A | A | B | B | B |
| Falling angle | 10–20 | 10–20 | 10–20 | 40–50 | 40–50 | 40–50 |
| Coefficient of static friction | 0.14 | 0.17 | 0.15 | 0.41 | 0.36 | 0.38 |
| Separation by cellophane tape | 20 | 18 | 15 | 285 | 306 | 323 |

[Group II: Examples of single use of fluorine compounds]

Referential Example 1 (Preparation of modifier)

Isophorone diisocyanate (71 parts) and 0.006 part of dibutyltin dilaurate were added to 221 parts of ethyl acetate. While the mixture thus obtained was stirred thoroughly at 80° C., 150 parts of fluorine alcohol having the following structure:

$$CF_3(CF_2)_7CH_2CH_2OH$$

were gradually added dropwise and reacted.

After the reaction was completed, ethyl acetate was removed by evaporation, whereby 214 parts of a milky white wax-like modifier (II-1) were obtained. From an infrared absorption spectrum of the modifier, an absorption by free isocyanate groups was observed at 2,270 cm$^{-1}$ and an absorption band based on —C—F$_2$— groups was observed at 1,190 cm$^{-1}$. As a result of a quantitative analysis of free isocyanate groups in the modifier, their content was found to be 5.80% while the theoretical value is 6.12%.

Accordingly, the principal structure of the above modifier is presumed to have the following formula:

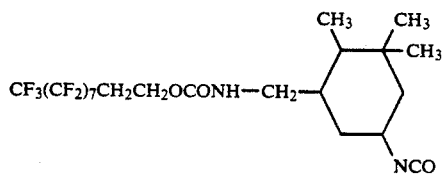

Referential Example 2 (Preparation of modifier)

To 318 parts of ethyl acetate, 198 parts of hydrogenated MDI and 0.009 part of dibutyltin dilaurate were added. While the mixture thus obtained was stirred thoroughly at 80° C., 220 parts of fluorine alcohol having the following structure:

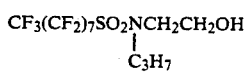

were gradually added dropwise and reacted.

After the reaction was completed, ethyl acetate was removed by evaporation, whereby 308 parts of a milky white wax-like modifier (II-2) were obtained.

From an infrared absorption spectrum of the modifier, an absorption by free isocyanate groups was observed at 2,270 cm$^{-1}$ and an absorption band based on —C—F$_2$- groups was observed at 1,190 cm$^{-1}$. As a result of a quantitative analysis of free isocyanate groups in the modifier, their content was found to be 4.52% while the theoretical value is 4.95%.

Accordingly, the principal structure of the above modifier is presumed to have the following formula:

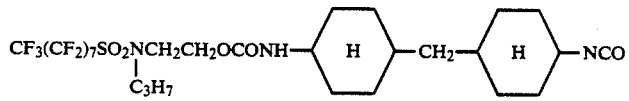

Referential Example 3 (Preparation of modifier)

To 272 parts of ethyl acetate, 62 parts of hexamethylene diisocyanate and 0.008 part of dibutyltin dilaurate were added. While the mixture thus obtained was stirred thoroughly at 80° C., 210 parts of fluorine alcohol having the following structure:

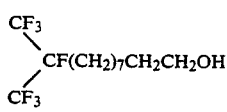

were gradually added dropwise and reacted.

After the reaction was completed, ethyl acetate was removed by evaporation, whereby 264 parts of a milky white wax-like modifier (II-3) were obtained. From an infrared absorption spectrum of the modifier, an absorption by free isocyanate groups was observed at 2,270 cm$^{-1}$ and an absorption band based on —C—F$_2$ groups was observed at 1,190 cm$^{-1}$. As a result of a quantitative analysis of free isocyanate groups in the modifier, their content was found to be 5.21% while the theoretical value is 5.73%.

Accordingly, the principal structure of the above modifier is presumed to have the following formula:

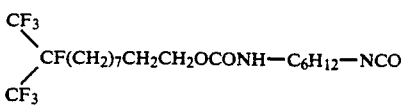

Referential Example 4 (Modification of resin)

To 300 parts of a fluoroolefin-vinyl ether copolymer resin solution (product of Asahi Glass Co., Ltd.; solid content: 50%; hydroxyl number: 24 mg-KOH/g), 5 parts of the modifier (II-1) were added and reacted at 80° C. for 6 hours, whereby a solution of a fluoropolymer modified with the above modifier was obtained. From an infrared absorption spectrum of the resultant modified resin, no isocyanate groups were recognized. This appears to indicate that the modifier was grafted on the resin.

Referential Example 5 (Modification of resin)

To 300 parts of a fluoroolefin-vinyl ether copolymer resin solution (product of Asahi Glass Co., Ltd.; solid content: 60%; hydroxyl number: 32 mg-KOH/g), 7 parts of the modifier (II-2) were added and reacted at 80° C. for 5 hours, whereby a solution of a fluoropolymer modified with the above modifier was obtained. From an infrared absorption spectrum of the modifier, no isocyanate groups were recognized. This appears to indicate that the modifier was grafted on the resin.

Referential Example 6 (Modification of resin)

To 300 parts of a fluoroolefin-vinyl ether copolymer resin solution (product of Asahi Glass Co., Ltd.; solid content: 50%; hydroxyl number: 26 mg-KOH/g), 5 parts of the modifier (II-3) were added and reacted at 80° C. for 4 hours, whereby a solution of a fluoropolymer modified with the above modifier was obtained. From an infrared absorption spectrum of the resultant modified resin, no isocyanate groups were recognized. This appears to indicate that the modifier was grafted on the resin.

Examples 1-3 and Comparative Examples 1-3

Based on a conventional method for the preparation of coating formulations, the modified resin solutions obtained in Referential Examples 4-6 were separately formed into coating formulations in accordance with their corresponding compositions shown in Table 3. Each of the coating formulations thus obtained was coated on a zinc-coated steel plate (phosphated) to give a dry coat thickness of 25 μm, followed by drying under conditions of 130° C.-1 minute and 25° C.-1 day to form a film. Various properties of each film were measured. The results are shown in Table 4.

In Comparative Examples 1-3, coating formulations were prepared from the unmodified fluoropolymer solutions used in Referential Examples 4-6, respectively.

TABLE 3
(Compositions of Coating Formulations)

| Component | Example 1 | Example 2 | Example 3 |
|---|---|---|---|
| Resin[1] | 100 | 100 | 100 |
| MEK | 75 | 75 | 75 |
| Xylene | 25 | 25 | 25 |
| Titanium oxide | 20 | 20 | 20 |
| Curing agent | 9.3 | 9.3 | 9.3 |
| Catalyst | 0.0004 | 0.0004 | 0.0004 |

| Component | Comp. Ex. 1 | Comp. Ex. 2 | Comp. Ex. 3 |
|---|---|---|---|
| Resin[2] | 100 | 100 | 100 |
| MEK | 75 | 75 | 75 |
| Xylene | 25 | 25 | 25 |
| Titanium oxide | 20 | 20 | 20 |
| Curing agent | 9.3 | 9.3 | 9.3 |
| Catalyst | 0.0004 | 0.0004 | 0.0004 |

TABLE 4
(Physical Properties of Films)

| Physical property of film | Example 1 | Example 2 | Example 3 | Comp. Ex. 1 | Comp. Ex. 2 | Comp. Ex. 3 |
|---|---|---|---|---|---|---|
| Gloss | 80 | 80 | 81 | 80 | 82 | 81 |
| Adhesion | 100/100 | 100/100 | 100/100 | 100/100 | 100/100 | 100/100 |
| Antifouling property | | | | | | |
| Lip stick | A | A | A | A | A | A |
| Crayon | A | A | A | A | A | A |
| Quick-drying felt pen[1] | B | B | B | C | C | C |
| Quick-drying felt pen[2] | A | A | A | A | A | A |
| Surface property | | | | | | |
| Water repellency | A | A | A | B | B | B |
| Falling angle | 15-25 | 15-25 | 15-25 | 40-50 | 40-50 | 40-50 |
| Coefficient of static friction | 0.20 | 0.22 | 0.18 | 0.41 | 0.36 | 0.38 |
| Separation by cellophane tape | 38 | 45 | 28 | 285 | 306 | 323 |

[Group III: Examples of single use of silane coupling agents]

Referential Example 1 (Preparation of modifier)

While 150 parts of an adduct of hexamethylene diisocyanate with water ("Duranate 24-A-100" trade name; product of Asahi Chemical Industry Co.,Ltd.; NCO%:=23.5) were stirred thoroughly at room temperature, 124 parts of 3-aminopropyltriethoxysilane were gradually added dropwise and reacted, whereby 274 parts of a colorless clear modifier (III-1) in the form of a viscous liquid were obtained.

From an infrared absorption spectrum of the modifier, an absorption by free isocyanate groups was observed at 2,270 cm$^{-1}$ and an absorption band based on —Si—O— groups was observed at 1,090 cm$^{-1}$. As a result of a quantitative analysis of free isocyanate groups in the modifier, their content was found to be 3.92% while the theoretical value is 4.20%.

Referential Example 2 (Preparation of modifier)

While 150 parts of an adduct of 1 mole of trimethylol propane with 3 moles of water ("Colonate HL", trade name; product of Nippon Polyurethane Industry Co., Ltd.; NCO%=12.5, solid content: 75%) were stirred thoroughly at room temperature, 76 parts of N-phenyl-γ-aminopropyltrimethoxysilane were gradually added dropwise and reacted, whereby 185 parts of a colorless clear modifier (III-2) in the form of a viscous liquid were obtained.

From an infrared absorption spectrum of the modifier, an absorption by free isocyanate groups was observed at 2,270 cm$^{-1}$ and an absorption band based on —Si—O— groups was observed at 1,090 cm$^{-1}$. As a result of a quantitative analysis of free isocyanate groups in the modifier, their content was found to be 2.82% while the theoretical value is 3.12%.

Referential Example 3 (Preparation of modifier)

While 150 parts of a trimer of hexamethylene diisocyanate ("Colonate EH", trade name; product of Asahi Chemical Industry Co. Ltd.; NCO%:21.3) were stirred thoroughly at room temperature, 99 parts of γ-mercaptopropyl trimethoxysilane were gradually added dropwise and reacted, whereby 249 parts of a colorless clear modifier (III-3) in the form of a viscous liquid were obtained.

From an infrared absorption spectrum of the modifier, an absorption by free isocyanate groups was observed at 2,270 cm$^{-1}$ and an absorption band based on —Si—O— groups was observed at 1,090 cm$^{-1}$. As a result of a quantitative analysis of free isocyanate groups in the modifier, their content was found to be 3.72% while the theoretical value is 4.0%.

Referential Example 4 (modification of resin)

To 300 parts of a fluoroolefin-vinyl ether copolymer resin solution (product of Asahi Glass Co., Ltd.; solid content: 50%; hydroxyl number: 24 mg-KOH/g), 18 parts of the modifier (III-1) were added and reacted at 80° C. for 6 hours, whereby a solution of a fluoropolymer modified with the above modifier was obtained. From an infrared absorption spectrum of the resultant modified resin, no isocyanate groups were recognized. This appears to indicate that the modifier was grafted on the resin.

Referential Example 5 (Modification of resin)

To 300 parts of a fluoroolefin-vinyl ether copolymer resin solution (product of Asahi Glass Co., Ltd.; solid content: 60%; hydroxyl number: 32 mg-KOH/g), 20 parts of the modifier (III-2) were added and reacted at 80° C. for 6 hours, whereby a solution of a fluoropolymer modified with the above modifier was obtained. From an infrared absorption spectrum of the resultant modified resin, no isocyanate groups were recognized. This appears to indicate that the modifier was grafted on the resin.

Referential Example 6 (modification of resin)

While 300 parts of an ethylene trifluoride chloride copolymer resin solution (product of Central Glass Co. Ltd.; solid content: 50%; hydroxyl number: 25 mg-KOH/g) were stirred thoroughly at room temperature, 20 parts of the modifier (III-3) were added and reacted at 80° C. for 6 hours, whereby a solution of a fluoropolymer modified with the above modifier was obtained. From an infrared absorption spectrum of the modifier, no isocyanate groups were recognized. This appears to indicate that the modifier was grafted on the resin.

Examples 1-3 and Comparative Examples 1-3

Based on a conventional method for the preparation of coating formulations, the modified resin solutions obtained in Referential Examples 4-6 were separately formed into coating formulations in accordance with their corresponding compositions shown in Table 5. Each of the coating formulations thus obtained was coated on a zinc-coated steel plate (phosphated) to give a dry coat thickness of 25 μm, followed by drying at room temperature (23° C., 36% RH) for 10 days to form a film. Various properties of each film were measured. The results are shown in Table 6.

In Comparative Examples 1-3, coating formulations were prepared by adding, as a curing agent, an isocyanate to the unmodified fluoropolymer solutions used in Referential Examples 4-6, respectively.

TABLE 5
(Compositions of Coating Formulations)

| Component | Example 1 | Example 2 | Example 3 |
|---|---|---|---|
| Resin[1] | 100 | 100 | 100 |
| MEK | 75 | 75 | 75 |
| Xylene | 25 | 25 | 25 |
| Titanium oxide | 20 | 20 | 20 |
| Curing agent | — | — | — |
| Catalyst | 0.001 | 0.001 | 0.001 |

| Component | Comp. Ex. 1 | Comp. Ex. 2 | Comp. Ex. 3 |
|---|---|---|---|
| Resin[2] | 100 | 100 | 100 |
| MEK | 75 | 75 | 75 |
| Xylene | 25 | 25 | 25 |
| Titanium oxide | 20 | 20 | 20 |
| Curing agent | 9.3 | 9.3 | 9.3 |
| Catalyst | 0.0004 | 0.0004 | 0.0004 |

TABLE 6
(Physical Properties of Films)

| Physical property of film | Example 1 | Example 2 | Example 3 |
|---|---|---|---|
| Gloss | 77 | 79 | 76 |
| Adhesion | 100/100 | 100/100 | 100/100 |
| Antifouling property | | | |
| Lip stick | A | A | A |
| Crayon | A | A | A |
| Quick-drying felt pen[1] | B | B | B |
| Quick-drying felt pen[2] | A | A | A |
| Surface property | | | |
| Water repellency | B | B | B |
| Falling angle | 40–50 | 40–50 | 40–50 |
| Coefficient of static friction | 0.41 | 0.37 | 0.38 |

| Physical property of film | Comp. Ex. 1 | Comp. Ex. 2 | Comp. Ex. 3 |
|---|---|---|---|
| Gloss | 79 | 81 | 78 |
| Adhesion | 100/100 | 100/100 | 100/100 |
| Antifouling property | | | |
| Lip stick | A | A | A |
| Crayon | A | A | A |
| Quick-drying felt pen[1] | C | C | C |
| Quick-drying felt pen[2] | A | A | A |
| Surface property | | | |
| Water repellency | B | B | B |
| Falling angle | 40–50 | 40–50 | 40–50 |
| Coefficient of static friction | 0.44 | 0.41 | 0.39 |

[Group IV: Examples of combined use of polysiloxane compounds and fluorine compounds]

Referential Example 1 (Preparation of modifier)

To 246 parts of ethyl acetate, 40 parts of an adduct of hexamethylene diisocyanate with water ("Duraconate 24-A-100" trade name; product of Asahi Chemical Industry Co. Ltd.; NCO%:23.5) and 0.007 part of dibutyltin dilaurate were added. While the mixture thus obtained was stirred thoroughly at 80° C., 164 parts of the polysiloxane used in Referential Example 2 of Group I were gradually added dropwise and reacted. Then, 42 parts of the fluorine alcohol used in Referential Example 3 of Group II were gradually added dropwise and reacted at the same temperature.

After the reaction was completed, ethyl acetate was removed by evaporation, whereby 237 parts of a milky white wax-like modifier (IV-1) were obtained.

From an infrared absorption spectrum of the modifier, an absorption by free isocyanate groups was observed at 2,270 cm$^{-1}$ and absorption bands based on —CF$_2$— groups and —Si—O— groups, respectively were observed at 1,190 cm$^{-1}$ and 1,090 cm$^{-1}$. As a result of a quantitative analysis of free isocyanate groups in the modifier, their content was found to be 1.21% while the theoretical value is 1.30%.

Accordingly, the principal structure of the above modifier is presumed to have the following formula:

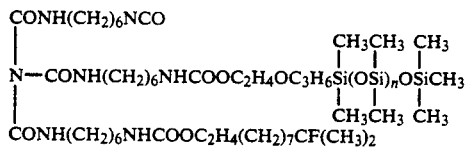

Referential Example 2 (Preparation of modifier)

To 300 parts of a fluoroolefin-vinyl ether copolymer resin solution (product of Asahi Glass Co. Ltd.; solid content: 50%; hydroxyl number: 24 mg-KOH/g), 4 parts of the modifier (I-1) and 3 parts of the modifier (II-3) were added and reacted at 80° C. for 7 hours, whereby a solution of a fluoropolymer modified with the modifiers was obtained.

From an infrared absorption spectrum of the resultant modified resin, no isocyanate groups were recognized. This appears to indicate that the modifiers were grafted on the resin.

Referential Example 3 (Preparation of modifier)

To 300 parts of a fluoroolefin-vinyl ether copolymer resin solution (product of Asahi Glass Co. Ltd.; solid content: 60%; hydroxyl number: 32 mg-KOH/g), 5 parts of the modifier (I-2) and the modifier (II-1) were added and reacted at 80° C. for 7 hours, whereby a solution of a fluoropolymer modified with the modifiers was obtained.

From an infrared absorption spectrum of the resultant modified resin, no isocyanate groups were recognized. This appears to indicate that the modifiers were grafted on the resin.

Referential Example 4 (Modification of resin)

To 300 parts of a fluoroolefin-vinyl ether copolymer resin solution (product of Asahi Glass Co. Ltd.; solid content: 50%; hydroxyl number: 26 mg-KOH/g), 5 parts of the modifier (I-3) and 3 parts of the modifier (II-2) were added and reacted at 80° C. for 7 hours, whereby a solution of a fluoropolymer modified with the modifiers was obtained.

From an infrared absorption spectrum of the resultant modified resin, no isocyanate groups were recognized. This appears to indicate that the modifiers were grafted on the resin.

Referential Example 5 (Modification of resin)

To 300 parts of the fluoroolefin-vinyl ether copolymer resin solution of Referential Example 4, 8 parts of the modifier (IV-1) were added and reacted at 80° C. for 5 hours, whereby a solution of a fluoropolymer modified with the above modifier was obtained.

From an infrared absorption spectrum of the modifier, no isocyanate groups were recognized. This appears to indicate that the modifier was grafted on the resin.

Examples 1–4 and Comparative Examples 1–3

Based on a conventional method for the preparation of coating formulations, the modified resin solutions obtained in Referential Examples 2–5 were separately formed into coating formulations in accordance with their corresponding compositions shown in Table 7. Each of the coating formulations thus obtained was coated on a zinc-coated steel plate (phosphated) to give a dry coat thickness of 25 μm, followed by drying at 130° C. for 1 minute and 25° C. for 1 day to form a film. Various properties of each film were measured. The results are shown in Table 8.

In Comparative Examples 1–3, coating formulations were prepared from the unmodified fluoropolymer solutions used in Referential Examples 2–5.

TABLE 7

| (Compositions of Coating Formulations) | | | | |
|---|---|---|---|---|
| | Example | | | |
| Component | 1 | 2 | 3 | 4 |
| Resin[1] | 100 | 100 | 100 | 100 |
| MEK | 75 | 75 | 75 | 75 |
| Xylene | 25 | 25 | 25 | 25 |
| Titanium oxide | 20 | 20 | 29 | 20 |
| Curing agent | 9.3 | 9.3 | 9.3 | 9.3 |
| Catalyst | 0.0004 | 0.0004 | 0.0004 | 0.0004 |
| Physical property of film | Comp. Ex. 1 | Comp. Ex. 2 | Comp. Ex. 3 | |
| Resin[2] | 100 | 100 | 100 | |
| MEK | 75 | 75 | 75 | |
| Xylene | 25 | 25 | 25 | |
| Titanium oxide | 20 | 20 | 20 | |
| Curing agent | 9.3 | 9.3 | 9.3 | |
| Catalyst | 0.0004 | 0.0004 | 0.0004 | |

TABLE 8

| (Physical Properties of Films) | | | | |
|---|---|---|---|---|
| Physical property of film | Example | | | |
| | 1 | 2 | 3 | 4 |
| Gloss | 79 | 80 | 79 | 78 |
| Adhesion | 100/100 | 100/100 | 100/100 | 100/100 |
| Antifouling property | | | | |
| Lip stick | A | A | A | A |
| Crayon | A | A | A | A |
| Quick-drying felt pen[1] | A | A | A | A |
| Quick-drying felt pen[2] | A | A | A | A |
| Surface property | | | | |
| Water repellency | A | A | A | A |
| Falling angle | 10–20 | 10–20 | 10–20 | 10–20 |
| Coefficient of static friction | 0.14 | 0.12 | 0.15 | 0.11 |
| Separation by cellophane tape | 17 | 14 | 16 | 18 |
| Physical | Comp. | Comp. | Comp. | |

TABLE 8-continued (Physical Properties of Films)

| property of film | Ex. 1 | Ex. 2 | Ex. 3 |
|---|---|---|---|
| Gloss | 80 | 82 | 81 |
| Adhesion | 100/100 | 100/100 | 100/100 |
| Antifouling property | | | |
| Lip stick | A | A | A |
| Crayon | A | A | A |
| Quick-drying felt pen | C | C | C |
| Quick-drying felt pen | A | A | A |
| Surface property | | | |
| Water repellency | B | B | B |
| Falling angle | 40–50 | 40–50 | 40–50 |
| Coefficient of static friction | 0.41 | 0.36 | 0.38 |
| Separation by cellophane tape | 285 | 306 | 323 |

[Group V: Examples of combined use of polysiloxane compounds and silane coupling agents]

Referential Example 1 (preparation of modifier)

To 360 parts of ethyl acetate, 100 parts of an adduct of hexamethylene diisocyanate and water ("Duranate 24A-100", trade name; product of Asahi Chemical Industry Co. Ltd.; NCO%:23.5%) and 0.01 part of dibutyltin dilaurate were added. While the mixture thus obtained was stirred thoroughly at 80° C., 103 parts of the polysiloxane employed in Referential Example 2 of Group I were gradually added dropwise and reacted. Then, at the same temperature, 72 parts of 3-aminopropyltriethoxysilane were gradually added dropwise to the resulting mixture and reacted.

After the reaction was completed, ethyl acetate was removed by evaporation, whereby 265 parts of a clear liquid modifier (V-1) were obtained.

From an infrared absorption spectrum of the modifier, an absorption by free isocyanate groups was observed at 2,270 cm$^{-1}$ and an absorption band based on —Si—O— groups was observed at 1,090 cm$^{-1}$.

As a result of a quantitative analysis of free isocyanate groups in the modifier, their content was found to be 2.52%, to the theoretical value is 2.88%.

Accordingly, the principal structure of the above modifier is presumed to have the following formula:

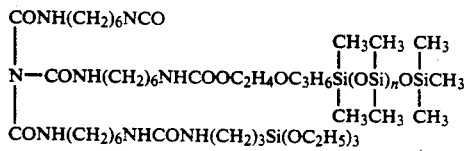

Referential Example 2 (modification of resin)

To 300 parts of a fluoroolefin-vinyl ether copolymer resin solution (product of Asahi Glass Co. Ltd.; solid content: 50%; hydroxyl number: 24mg-KOH/g), 15 parts of the modifier (III-1) and 6 parts of the modifier (I-1) were added and reacted at 80° C. for 7 hours, whereby a solution of a fluoropolymer modified with the modifiers was obtained.

From an infrared absorption spectrum of the resulting modified resin, no isocyanate groups were recognized. This appears to indicate that the modifiers were grafted on the resin.

Referential Example 3 (Modification of resin)

To 300 parts of a fluoroolefin-vinyl ether copolymer resin solution (product of Asahi Glass Co. Ltd.; solid content: 60%; hydroxyl number: 32 mg-KOH/g), 16 parts of the modifier (III-2) and 7 parts of the modifier (I-2) were added and reacted at 80° C. for 7 hours, whereby a solution of a fluoropolymer modified with the modifiers was obtained.

From an infrared absorption spectrum of the resultant modified resin, no isocyanate groups were recognized. This appears to indicate that the modifiers were grafted on the resin.

Referential Example 4 (modification of resin)

To 300 parts of an ethylene trifluoride chloride copolymer resin solution (product of Central Glass Co. Ltd.; solid content: 50%; hydroxyl number: 25 mg-KOH/g), 16 parts of the modifier (III-3) and 6 parts of the modifier (I-3) were added and reacted at 80° C. for 7 hours, whereby a solution of a fluoropolymer modified with the above modifiers was obtained.

From an infrared absorption spectrum of the resultant modified resin, no isocyanate groups were recognized. This appears to indicate that the modifiers were grafted on the resin.

Referential Example 5 (modification of resin)

To 300 parts of the fluoropolymer of Referential Example 2, 20 parts of the modifier (V-1) were added and reacted at 80° C. for 7 hours, whereby a solution of a fluoropolymer modified with the above modifier was obtained.

From an infrared absorption spectrum of the resultant modified resin, no isocyanate groups were recognized. This appears to indicate that the modifier was grafted on the resin.

Examples 1–4 and Comparative Examples 1–3

Based on a conventional method for the preparation of coating formulations, the modified resin solutions obtained in Referential Examples 2–5 were separately formed into coating formulations in accordance with their corresponding compositions shown in Table 9. Each of the coating formulations thus obtained was coated on a zinc-coated steel plate (phosphated) to give a dry coat thickness of 25 μm, followed by drying at room temperature (23° C., 36%RH) for 10 days to form a film. Various properties of each film were measured. The results are shown in Table 10.

In Comparative Examples 1–3, coating formulations were prepared by adding an isocyanate, as a curing agent, to the unmodified fluoropolymer solutions employed in Referential Examples 2–5, respectively.

TABLE 9

(Compositions of Coating Formulations)

| Component | Examples | | | |
|---|---|---|---|---|
| | 1 | 2 | 3 | 4 |
| Resin[1] | 100 | 100 | 100 | 100 |
| MEK | 75 | 75 | 75 | 75 |
| Xylene | 25 | 25 | 25 | 25 |
| Titanium oxide | 20 | 20 | 29 | 20 |
| Curing agent | — | — | — | — |
| Catalyst | 0.001 | 0.001 | 0.001 | 0.001 |

| Component | Comp. Ex.1 | Comp. Ex. 2 | Comp. Ex. 3 |
|---|---|---|---|
| Resin[2] | 100 | 100 | 100 |
| MEK | 75 | 75 | 75 |

TABLE 9-continued

| (Compositions of Coating Formulations) | | | |
|---|---|---|---|
| Xylene | 25 | 25 | 25 |
| Titanium oxide | 20 | 20 | 20 |
| Curing agent | 9.3 | 9.3 | 9.3 |
| Catalyst | 0.0004 | 0.0004 | 0.0004 |

TABLE 10

| Physical property of film | (Physical properties of films) | | | | | | |
|---|---|---|---|---|---|---|---|
| | Examples | | | | | | |
| | 1 | 2 | 3 | 4 | Comp. Ex. 1 | Comp. Ex. 2 | Comp. Ex. 3 |
| Gloss | 78 | 78 | 77 | 79 | 79 | 80 | 78 |
| Adhesion | 100/100 | 100/100 | 100/100 | 100/100 | 100/100 | 100/100 | 100/100 |
| Antifouling property | | | | | | | |
| Lip stick | A | A | A | A | A | A | A |
| Crayon | A | A | A | A | A | A | A |
| Quick-drying felt pen[1] | A | A | A | A | C | C | C |
| Quick-drying felt pen[2] | A | A | A | A | A | A | A |
| Surface property | | | | | | | |
| Water repellency | A | A | A | A | B | B | B |
| Falling angle | 10–20 | 10–20 | 10–20 | 10–20 | 40–50 | 40–50 | 40–50 |
| Coefficient of static friction | 0.12 | 0.14 | 0.16 | 0.12 | 0.44 | 0.41 | 0.39 |
| Separation by cellophane tape | 19 | 14 | 18 | 17 | 285 | 306 | 322 |

[Group VI Examples of combined use of fluorine compounds and silane coupling agents]

Referential Example 1 (preparation of modifier)

To 80 parts of ethyl acetate, 100 parts of an adduct of hexamethylene diisocyanate and water ("Duranate 24A-100", trade name; product of Asahi Chemical Industry Co.,Ltd.; NCO%=23.5%) and 0.02 part of dibutyltin dilaurate were added. While the mixture thus obtained was stirred thoroughly at 80° C., 22 parts of the fluorine alcohol employed in Referential Example 1 of Group II were gradually added dropwise and reacted. Then, at the same temperature, 72 parts of 3-aminopropyltriethoxysilane were gradually added dropwise to the resulting mixture and reacted.

After the reaction was completed, ethyl acetate was removed by evaporation, whereby 188 parts of a milky white wax-like modifier (V-1) were obtained.

From an infrared absorption spectrum of the modifier, an absorption by free isocyanate groups was observed at 2,270 cm$^{-1}$ and an absorption band based on —Si—O— groups was observed at 1,090 cm$^{-1}$.

As a result of a quantitative analysis of free isocyanate groups in the modifier, their content was found to be 3.68% while the theoretical value is 4.10%.

Accordingly, the principal structure of the above modifier is presumed to have the following formula:

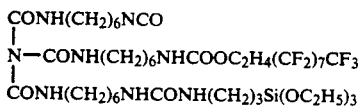

Referential Example 2 (modification of resin)

To 300 parts of a fluoroolefin-vinyl ether copolymer resin solution (product of Asahi Glass Co. Ltd.; solid content: 50%; hydroxyl number:24 mg-KOH/g), 15 parts of the modifier (III-1) and 4 parts of the modifier (II-1) were added and reacted at 80° C. for 7 hours, whereby a solution of a fluoropolymer modified with the modifiers was obtained.

From an infrared absorption spectrum of the resulting modified resin, no isocyanate groups were recognized. This appears to indicate that the modifiers were grafted on the resin.

Referential Example 3 (modification of resin)

To 300 parts of a fluoroolefin-vinyl ether copolymer resin solution (product of Asahi Glass Co. Ltd.; solid content: 60%; hydroxyl number:32 mg-KOH/g), 16 parts of the modifier (III-2) and 4 parts of the modifier (II-2) were added and reacted at 80° C. for 7 hours, whereby a solution of a fluoropolymer modified with modifiers was obtained.

From an infrared absorption spectrum of the resulting modified resin, no isocyanate groups were recognized. This appears to indicate that the modifiers were grafted on the resin.

Referential Example 4 (modification of resin)

To 300 parts of an ethylene trifluoride chloride copolymer resin solution (product of Central Glass Co. Ltd.; solid content: 50%; hydroxyl number: 25 mg-KOH/g), 16 parts of the modifier (III-3) and 3 parts of the modifier (II-3) were added and reacted at 80° C. for 7 hours, whereby a solution of a fluoropolymer modified with the above modifiers was obtained.

From an infrared absorption spectrum of the resulting modified resin, no isocyanate groups were recognized. This appears to indicate that the modifiers were grafted on the resin.

Referential Example 5 (modification of resin):

To 300 parts of the fluoropolymer of Referential Example 2, 14 parts of the modifier (VI-1) were added and reacted at 80° C. for 7 hours, whereby a solution of a fluoropolymer modified with the above modifier was obtained.

From an infrared absorption spectrum of the resulting modified resin, no isocyanate groups were recognized. This appears to indicate that the modifier was grafted on the resin.

Examples 1–4 and Comparative Examples 1–3

Based on a conventional method for the preparation of coating formulations, the modified resin solutions obtained in Referential Examples 2–5 were separately formed into coating formulations in accordance with their corresponding compositions shown in Table 11. Each of the coating formulations thus obtained was coated on a zinc-coated steel plate (phosphated) to give a dry coat thickness of 25 μm, followed by drying at room temperature (23° C., 36%RH) for 10 days to form a film. Various properties of each film were measured. The results are shown in Table 12.

In Comparative Examples 1–3, coating formulations were prepared by adding an isocyanate as a curing agent to the unmodified fluoropolymer solutions employed in Referential Examples 2–5.

TABLE 11

(Compositions of Coating Formulations)

| Component | Examples | | | |
|---|---|---|---|---|
| | 1 | 2 | 3 | 4 |
| Resin[1] | 100 | 100 | 100 | 100 |
| MEK | 75 | 75 | 75 | 75 |
| Xylene | 25 | 25 | 25 | 25 |
| Titanium oxide | 20 | 20 | 29 | 20 |
| Curing agent | — | — | — | — |
| Catalyst | 0.001 | 0.001 | 0.001 | 0.001 |

| Component | Comp. Ex. 1 | Comp. Ex. 2 | Comp. Ex. 3 |
|---|---|---|---|
| Resin[2] | 100 | 100 | 100 |
| MEK | 75 | 75 | 75 |
| Xylene | 25 | 25 | 25 |
| Titanium oxide | 20 | 20 | 20 |
| Curing agent | 9.3 | 9.3 | 9.3 |
| Catalyst | 0.0004 | 0.0004 | 0.0004 |

In the above Tables 1, 3, 5, 7, 9 and 11, the individual components are as follows:
  Resin[1]) Modified resin (solid content: 50%)
  Resin[2]) Unmodified resin (solid content: 50%)
  Titanium: Titanium oxide "CR-90"
  Curing agent: "Colonate EH" (product of Nippon Polyurethane Industry Co., Ltd.)
  Catalyst: Dibutyltin dilaurate (prepared to finally give the same amount in view of the amount added upon preparation of each modifier)

TABLE 12

(Physical Properties of Films)

| Physical property of film | Examples | | | |
|---|---|---|---|---|
| | 1 | 2 | 3 | 4 |
| Gloss | 78 | 78 | 76 | 79 |
| Adhesion | 100/100 | 100/100 | 100/100 | 100/100 |
| Antifouling property | | | | |
| Lip stick | A | A | A | A |
| Crayon | A | A | A | A |
| Quick-drying felt pen | B | B | B | B |
| Quick-drying felt pen | A | A | A | A |
| Surface property | | | | |
| Water repellency | A | A | A | A |
| Falling angle | 15–25 | 15–25 | 15–25 | 15–25 |
| Coefficient of static friction | 0.24 | 0.21 | 0.19 | 0.21 |
| Separation by cellophane tape | 41 | 46 | 32 | 36 |

| Physical property of film | Comp. Ex. 1 | Comp. Ex. 2 | Comp. Ex. 3 |
|---|---|---|---|
| Gloss | 81 | 80 | 78 |
| Adhesion | 100/100 | 100/100 | 100/100 |
| Antifouling property | | | |
| Lip stick | A | A | A |
| Crayon | A | A | A |
| Quick-drying felt pen[1]) | C | C | C |
| Quick-drying felt pen[2]) | A | A | A |
| Surface property | | | |
| Water repellency | B | B | B |
| Falling angle | 40–50 | 40–50 | 40–50 |
| Coefficient of static friction | 0.44 | 0.41 | 0.39 |
| Separation by cellophane tape | 285 | 306 | 322 |

In the above Tables 2, 4, 6, 8, 10 and 12, the measurement or judgment of each property was conducted in the following manner:
  Gloss: 60° Gloss
  Adhesion: crosshatching peeling by adhesive cellophane tape
  Antifouling property:
    Lipstick and Crayon: Wiped off by a dry cloth.
    Quick-drying felt pens: Black and red ones were used.
      1): Wiped off by a dry cloth.
      2): Wiped off with a mixed solvent of petroleum benzine/ethanol (weight ratio: 1/1)
    Standard for judgment:
      A: No stains were left.
      B: Slight stains were left.
      C: Clear stains were left.
  Surface property:
  Standard for judgment of water repellency:
      A: Water was repelled well.
      B: Water was repelled relatively well.
  Falling angle (°): Angle at which a water droplet began to slip down when a coated material was tilted (measured using a contact angle gauge manufactured by Kyowa Kaimen Kagaku Co., Ltd.)
  Separation by cellophane tape: JIS C 2107 was followed. Peeling force (g/m$^2$) required to remove a cellophane tape (product of Nichiban Co., Ltd.) applied under a predetermined pressure was measured upon an elapsed time of 3 days at 25° C.

I claim:

1. A coating composition comprising:
   a film-forming component of a reaction product of a fluoropolymer with a modifier;
   wherein said fluoropolymer is a copolymer of fluorine-containing olefin monomers and other monomers containing one or more functional groups reactive with an isocyanate group and
   wherein said modifier is a reaction product of silane coupling agents containing at least one reactive organic functional group,
   with an organic polyisocyanate;
   wherein said modifier contains at least one free isocyanate group.

2. The composition of claim 1, further comprising a curing agent.

3. The coating composition of claim 1, wherein said film-forming fluoropolymer is in a proportion of about 5–30 wt. % per 100 parts by weight of the coating composition.

4. The coating composition of claim 1, wherein said modifier is in a proportion of 1–100 parts by weight per 100 parts by weight of said fluorpolymer.

5. The coating composition of claim 1, additionally comprising an element selected organic pigments, inorganic pigments, plasticizers, ultraviolet absorbers, antistatic agents, leveling agents, curing agents, catalyst or a mixture thereof.

6. The composition of claim 1, additionally comprising 0.0001–1 part by weight per 100 parts by weight of said coating composition of an amine or organic-metal catalyst.

7. The coating composition of claim 1, wherein said modifier is a reaction product of silane coupling agents and a compound selected from the group consisting of polysiloxane compounds, and fluorine-containing compounds or a mixture thereof, each compound containing at least one reactive organic function group,
   with an organic polyisocyanate.

* * * * *